United States Patent [19]

Legrain

[11] Patent Number: 5,355,833
[45] Date of Patent: Oct. 18, 1994

[54] COMPUTER AIDED FEED DISTRIBUTION EQUIPMENT FOR YOUNG ANIMALS

[75] Inventor: Michel Legrain, Foulbec, 27210 Beuzeville, France

[73] Assignee: Michel Legrain, France

[21] Appl. No.: 45,207

[22] Filed: Apr. 13, 1993

[30] Foreign Application Priority Data

Apr. 14, 1992 [FR] France .................... 92 04536

[51] Int. Cl.⁵ .............................................. A01K 5/02
[52] U.S. Cl. ........................... 119/51.02; 119/57.92; 119/71; 364/413.03; 364/571.02
[58] Field of Search .......... 119/51.02, 71, 57.92, 119/57.1, 72, 842; 364/551.01, 479, 413.03, 571.03; 340/573

[56] References Cited

U.S. PATENT DOCUMENTS

| | | | |
|---|---|---|---|
| 3,473,516 | 10/1969 | Legrain | 119/71 |
| 3,557,758 | 1/1971 | Lack | 119/51.02 |
| 4,463,353 | 7/1984 | Kuzara | 119/51.02 |
| 4,589,372 | 5/1986 | Smith | 119/51.02 |
| 4,617,876 | 10/1986 | Hayes | 119/155 |
| 4,803,955 | 2/1989 | Gonsalves | 119/71 |
| 5,036,462 | 7/1991 | Kaufman et al. | 364/479 |
| 5,067,443 | 11/1991 | Hurnik et al. | 119/71 |
| 5,069,165 | 12/1991 | Rousseau | 119/51.02 |
| 5,157,604 | 10/1992 | Axford et al. | 364/413.03 |
| 5,205,240 | 4/1993 | Colas et al. | 119/72 |

FOREIGN PATENT DOCUMENTS

| | | |
|---|---|---|
| 0064597 | 11/1982 | European Pat. Off. |
| 3144477 | 11/1982 | Fed. Rep. of Germany ... 119/51.02 |
| 3833902 | 11/1989 | Fed. Rep. of Germany . |
| 2507776 | 12/1982 | France ................ 119/51.02 |
| 8601297 | 12/1987 | Netherlands . |
| 0843889 | 7/1981 | U.S.S.R. ............ 119/51.02 |
| 0938856 | 6/1982 | U.S.S.R. ............ 119/51.02 |
| 1526616 | 12/1989 | U.S.S.R. ............ 119/51.02 |
| 1609637 | 11/1991 | U.S.S.R. ............ 119/51.02 |

Primary Examiner—Paul J. Hirsch
Assistant Examiner—Todd E. Manahan
Attorney, Agent, or Firm—Banner, Birch, McKie & Beckett

[57] ABSTRACT

The equipment includes a set of feed distribution stations each furnished with a mixer supplied with milk powder, water, milk from a tank and various additives from a set of measuring pumps whose number of rotations is controlled by computer system depending on the feed mix to be composed. The measuring pumps are primed by the additive supply tanks. There are as many tanks as additives to dispense. The set of measuring pumps at each feeding station withdraws the selectively programmed quantity from each tank depending on the mix to be constituted. Each animal that is present at a station and that is identified, is credited with a volume of feed that is around 500 grams, whose composition depends on the animal's previous intake, on the weight newly recorded, and on other criteria. The station mixes the feed on demand while the animal is ingesting it. There always remains a certain volume of feed in the mixer after the departure of the animal. This volume is subtracted from the animal's credit so as to precisely calculate the animal's feed intake.

42 Claims, 5 Drawing Sheets

COMPUTER AIDED FEED DISTRIBUTION EQUIPMENT FOR YOUNG ANIMALS

FIELD OF THE INVENTION

1. Background of the Invention

This invention is concerned with computer aided feeding equipment, and in particular, equipment that distributes feed that is adapted to the growth and well being of young animals, from a few days old up to three months in age, and also adapted depending on the use to be made of the animal, particularly calves, lambs, kids.

2. Description of the Related Art

In the art, there are known papers analyzing and comparing different animal test results in relation to their feeding, for example, *Institut National de la Recherche Agronomique*, 1978. *Alimentation des Ruminants. Ed. INRA Publications, Versailles, France*, hereafter INRA and *Commission Specialisee sur la Recherche Ovine et Bovine*, 1975. *L'allaitement artificial des agneaux et des chevreaux. Ed. R. Ortavant, SEI Versailles, France*, hereinafter the Commission report, both of which are hereby incorporated by reference. However, known feeding equipment remains limited.

There exists computer aided feeding equipment that manages the feeding of young animals. This equipment blindly delivers to the animal an amount of food that is fixed and entered manually following mechanical rules. These feedings are identical for all animals. It does not give the animal any means of intervention with respect to its own feeding. This sequential and rigid feeding results in an unbalanced natural rhythm for the animal. The animal develops psychological disruption, stress, then various illnesses by eating and drinking too much or too little. Animals fed in this way have even been seen becoming cannibals and eating each other. These rigid feeding programs are the works of specialists in the field of computer programming, who lack the global and specific synthesized knowledge of an animal farmer.

An improvement brought to this equipment is based on the observations of groups of animals for a period of three months, the period of milk feeding. The observed conditions correspond to a specific slice of time and to a specific group of animals. The results of the observations of a first group of animals are not adapted to another group of animals during a different slice of time. The observations of a group during the winter are not applicable to another group during another season and another geographical site for which the climatic conditions vary according to different amplitudes and frequencies. Such equipment therefore is not individualized and not adaptable to timely variations that occur in the field, away from the observations of the design specialists. It is therefore not surprising that animals fed in this way cannot develop themselves in good conditions, and are subject to varied feeding unbalances with all the consequences that this brings to their health.

SUMMARY OF THE INVENTION

It is an object of this invention to counteract these problems by creating an economical feed distribution system adapted to the "right measure" in accordance with the needs created by the rhythm of growth of each animal.

In the invention, other complementary criteria may be taken into account such as the ultimate use of the animal: replacement, reproduction or meat production. The process may also take into account the fact that the mother's presence is fundamental for the animal to become accustomed to its environment during a first period of growth. All mammals are extremely dependent on their mothers during the milk feeding period. If the mother dies, the calf dies. This period is enhanced in the process of this invention and not suppressed as is done when using other automatic feeding equipment. To calm the young animal, the voice of its mother is recorded and a continuous playback is started when the animal has entered the feeding station and has been identified. The process also takes into account the seasonal climatic changes and all changes that will be found around the planet wherever the equipment is in operation.

In accordance with a preferred embodiment of the computer aided feeding equipment for young animals, the equipment includes:

an environmental variations monitor permitting modification of the composition and amount of the different feeds; an identifier (for example, see copending U.S. Patent Application by Michel Legrain filed concurrently with this U.S. Patent Application and entitled "INDIVIDUAL ANIMAL IDENTIFICATION SYSTEM IN A CONTROL STATION", the disclosure of which is incorporated herein by reference) identifying each animal present in the feeding station; a scale weighing the animal present in the feeding station; a length of stay monitor monitoring the stay of the identified animal in the feeding station; a mixer mixing the various products constituting the individualized feed ration distributed through the nipple at each feeding station; a processor recording the weight and the composition of the ration selectively distributed to each animal, with the processor comparing an index of growth, fattening, and other criteria of comparison for maximizing the growth between each stay in the feeding station and the frequency of stay; the processor comparing the growth based on the average of the group or a traction of the group; the processor comparing the growth between each animal as a function of the different feed compositions; the processor creating and updating the results obtained in the growth of the animal, the environmental factors, the composition of the different feed rations during different seasons, the animals, the site, all during the course of the various periods of milk feeding;

a player to playback a prerecorded sound of the identified animal mother's voice, at whichever feeding station the animal is present; a video camera for observing the behavior of each animal in the feeding stations; a tester sequentially testing each identified animal as to temperature, variations in fat thickness, the animal's level of assimilation by the analysis of its excrement, its muscle tone, blood and urine analysis, and which test results are stored in a memory of the computer; an analyzer analyzing the results of the different tests and translating the results into a modification of the composition of the feed of each animal; software and electronic means for controlling the means of selectively distributing specific doses of different products to the mixer in each feeding station, the combination constituting an aided feeding specific to each identified animal as a function of the variations of the environment and of each animals different needs.

In accordance with the invention, the mixer includes a container mounted to at least one nipple. The container is supplied with milk powder by a hopper whose lower tubular end surrounds an Archimedes' screw assuring the dispensing of the powder. This screw is connected to a tube which is rotated at a slow speed by a reduction motor and gear mechanism. An electric motor turns at a high speed, a mixing blade being attached to the lower end of a rod in the tube on which a cleaning disk placed in a horizontal orientation is attached. At least one electric heating element maintains a constant internal temperature with the aid of a thermostat. The feed additives are dispensed by means of a set of peristaltic pumps whose dispensing tube falls into the container. A means of cleaning/rinsing is accomplished by a tube acting as a siphon, placed on the inside of the container, which is attached to a hose which flushes the rinsing water. The cleaning cycle is done periodically during the absence of an animal in the feeding station. The computer system is designed to control the pump by comparing the volume dispensed and the corresponding weight given by the scale.

The system that supplies milk, from a milk tank whose bottom is generally lower than the container, to the mixer includes a means to prevent draining of the pump which supplies the milk to a heating coil attached to the mixer.

According to this invention, the feeding stations are each equipped with a mixer which is selectively supplied with milk powder, water, milk from a tank and with different additives by means of a set of measuring pumps which are controlled by the computer depending on the composition of the feed. The measuring pumps are primed by the additive supply tanks. The pumps withdraw the selectively programmed quantities from the additive tanks depending on the composition of the feed to make for each different animal. Each animal that enters the feeding station is identified and credited, by the computer, with a pre-defined quantity of feed whose composition is determined by the animal's past feed intake, the animal's weight that has just been recorded and from other various criteria which define the composition of the feed. The feed is produced on demand at the feeding station while the animal is present. There always remains a certain volume of feed in the mixer when the animal leaves the feeding station. The computer system is designed to deduct this amount from the animal's credit so as to exactly determine the exact volume of the animal's intake.

According to the invention, some embodiments use a single mixer per two feeding stations. The computer system then calculates an average every time between two animals, in accordance with the same criteria from one mixer per feeding station.

According to the invention, a monitor monitoring the environmental variations includes a set of sensors such as a thermometer, a hygrometer, a pluviometer, means of measuring the variation in sunlight, means of measuring solar and cosmic rays, and other sensors that monitor the environment when the equipment is first setup such as local magnetic field, water analysis and air analysis. The results of the measurements are used by the computer system in real time for the management of the equipment.

The advantages according to this invention include:
systemic function of the equipment, the computer management of the feeding is a means given to the animal to allow it to regulate its own feed depending on its needs,
automatic monitoring of various variations in the environment which influence the growth of the animal and the adjustments of the composition of the feed for each animal,
optimization of the growth of each animal fed,
preservation of the animals psychological and physical equilibrium, and therefore their well-being and health, by giving the animals the freedom to feed whenever they are hungry or thirsty and giving them the quantity that they want to ingest,
economy of feed by dispensing the right amount necessary to optimize the growth of the animal,
simple equipment therefore highly reliable, and
low maintenance of the equipment, since the distributor/mixer and measuring pumps controlled by the computer are self cleaning which also creates a high degree of hygiene.

BRIEF DESCRIPTION OF THE DRAWINGS

The invention is described in detail in the following text with reference to the attached drawings which are given only as non-limiting examples in which.

DETAILED DESCRIPTION OF PREFERRED EMBODIMENTS

Figure 1:
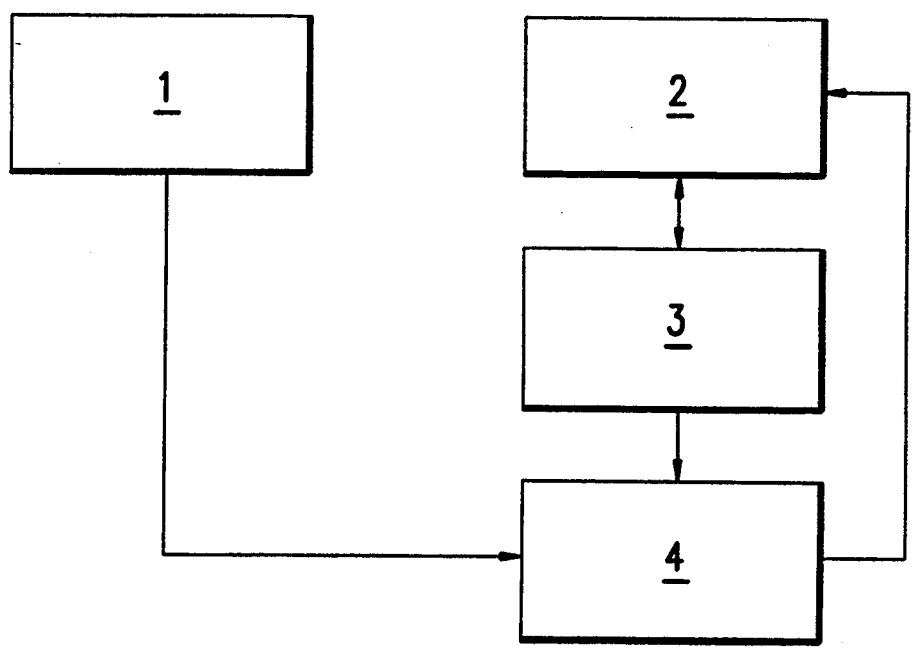
FIG. 1 shows a cybernetic operation diagram of the computer aided equipment according to this invention.

FIG. 1 shows the cybernetic operation of the computer aided feeding equipment including:

a set of sensors 1 for monitoring the environmental variations inside and outside of the building;

selective feed distribution stations 2 for selectively dispensing feed whose composition is determined, on demand, in accordance with the growth phase and the evolving individual need of each animal in the group;

monitor 3 monitoring an index of growth (i.e., yield of growth) of the feed consumed and of the specific behavior of each animal, the index of growth being the increase in weight (or fat, or whatever) per kilogram of animal weight per kilogram of feed ration determined between successive stays in the feeding station (or per day) for a predetermined composition mix of feed components; and processor 4 for recording and analyzing the results of monitor 3, for interpreting the variations in the environment reported from sensor set 1 and for translating these results into selective modifications of the composition of the feed dispensed by feeding station 2 to each animal in the group.

The environment for which the variations are monitored by sensor set 1 is the one in which the young animals live: the building, the field, the geographic location, the general climate and the micro-climate (plains, hills, mountains, . . . ), the specific flora which participates in the animal's feeding and the different periods of day and night. The principal sensors used in sensor set 1 are the following: thermometer. hygrometer, pluviometer, sunlight measurement means, solar and cosmic ray measurement means. Other measurements are taken when the equipment is setup including: local magnetic field measurements, water analysis, and air analysis. The results of these measurements are used in real time by the computer system which controls the equipment.

The composition of the feed dispensed by feeding station 2 is based on the known norms of animal nutrition, for example as described in the INRA publication. The computer system acts on the proportion of the different feed products which form the composition of the feed ration, depending on the assimilation capacity of each animal identified in the feeding station, depending on its behavior, depending on the particular animal's results as compared to average results, and in general depending on the results and comparisons performed in processor 4. The feed composition may include: whole milk, milk powder based reconstituted milk, water, skim milk, whey, . . . , and of additives such as fats, amino acids, ferments, trace elements, lecithin, drugs, etc.

The tests done in monitor 3 include the following: weight of the animal with a scale located in the feeding station; temperature of the animal with a thermometer preferably located in nipple 12; the animal grower's expert judgment of the change in the animal's fat thickness, muscle tone, behavior (calm or nervous) and/or general health; blood analysis, excrement analysis and/or urine analysis during periodic laboratory tests; and sensing of the frequency of presence and length of stay in the feeding station during 24 hours and sensing the weight of the feed ingested. Certain tests are only performed periodically and not each time the animal is present in the feeding station. The excrement analysis allows the monitoring of the animal's feed assimilation capacity and the recordation of what has been wasted (e.g., fats or sugars) so as to modify the feed composition of the corresponding animal at its next feeding. The blood analysis may also monitor iron, fats and sugars and the urine analysis may monitor urea and sugars.

The process steps performed in processor 4 which act selectively on the feed composition include the following:

recording the weight modification of each animal during its growth, and the weight and composition of each ration selectively produced and dispensed to each animal;

comparing the yield in weight (i.e., the index of weight), the yield in fat (i.e., the index of fat) and other criteria to optimize the growth during each feeding, and optimize the frequency of each feeding;

comparing growth based on the average results of the group or on a fraction of the group of animals;

comparing growth between each animal based on the results obtained from different feed compositions;

gathering and updating results obtained from various environmental parameters, the feed compositions being adjusted according to seasonal factors, the age of animals, the site, and gathering and updating these results during multiple periods of milk feeding;

performing comparative analysis of different tests and interpreting the results of the analysis so as to modify the feed composition of each animal; and controlling the selective dispensing of specific doses of various additives in the mixer at each feeding station. This constitutes the aided feeding of each identified animal as a function of the variations in their environment and their different needs during their growth.

Seasonal factors adjusting the quantity and composition mix of feed components for animals during different seasons are known and generally available in reference books used by the growers of the animals. Similarly, factors based on the age of the animal are known for adjusting the quantity and composition mix of feed components for animals based on both age and season.

In addition, specific goals for the animal may be achieved by controlling the diet of the animal. For example, when raising veal calves, it is desirable to minimize, within limits, the blood iron or red blood cell count in the animal's blood. The animal grower may use known reference books to determine desired modifications to the composition mix of feed components for the animal which will lower or raise the blood iron level so as to optimize the health of the animal while achieve optimum veal production. The known relationship of the blood iron level desired, the blood iron level measured and the composition mix of feed components is preferably incorporated into a model for a computer program which runs on processor 4 to control the selective feed distribution stations 2 to optimize veal production.

Furthermore, an animal grower may study the relationship between a growth result, such as increase in weight per day, and a particular feed additive or component, such as a vitamin. The grower would compare the yield in weight produced by two different animals fed different diets, but otherwise similar in age, season of the year, etc. A difference in yield in weight which indicated a trend would show the relationship between yield in weight and the particular feed additive for an animal at the particular animal's age, during a particular season, etc. Many animals may be studied this way and averages obtained to develop a relationship to be incorporated into a model for a computer program which runs on processor 4 to control the selective feed distribution stations 2 to optimize production of the other animals not participating in the study.

This equipment works in a cybernetic loop. The equipment takes into account known evolving growth needs, for example as described in the INRA publication, of each animal as a function of the environmental variations (e.g., adjusting for known environment factors and factors based on the age of the animal). It is the animal who dictates the time, the quantity, and the frequency of its feeding. The computer system optimizes the feed composition and the animal growth as a function of the animal's ultimate use: meat production, replacement, reproduction.

Figure 2:
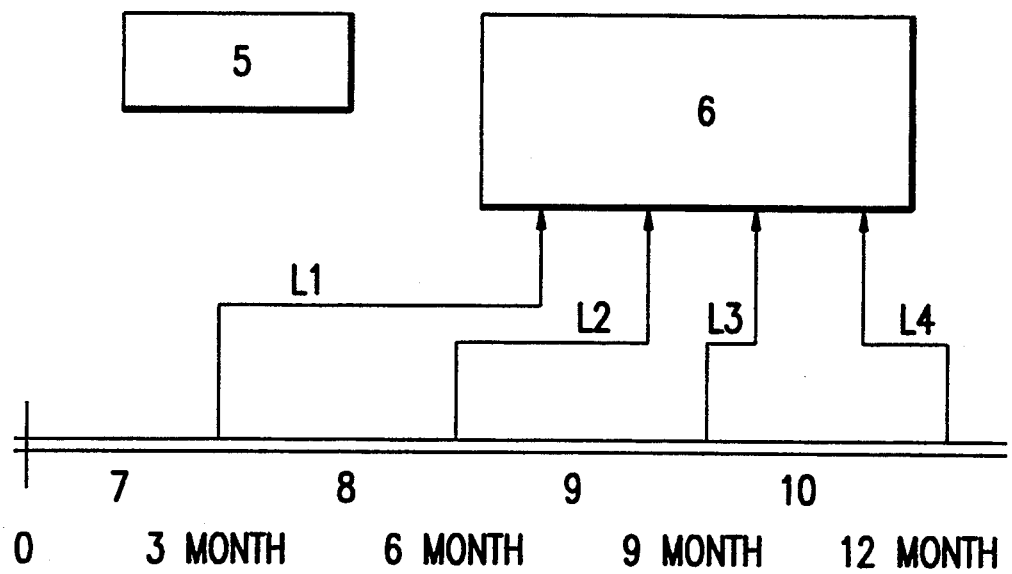
FIG. 2 shows a comparative diagram of the sequential operation of other existing equipment.

FIG. 2 shows a diagram of the sequential operation of existing equipment. The environmental variations are only taken into account sequentially and only partly so. The operation of this equipment 6 is based on an automated, rigid, and arbitrarily fixed feeding method. This gives the animal no means of controlling its own feeding. The modification brought to the feed composition, which is identical for all animals, is done based on observations of a group of animals during a period of about three months 7, 8, 9, 10 (length of milk feeding period). The modifications are used with each following group of animals L1, L2, L3, L4. These are different animals during different seasons (every three months). The corrections are therefore never adapted to the conditions of the new period nor to the new animal to feed. This equipment operates sequentially and blindly. There is never a pertinent feedback actuated in real time to take into account the real needs of the animals.

Figure 3:
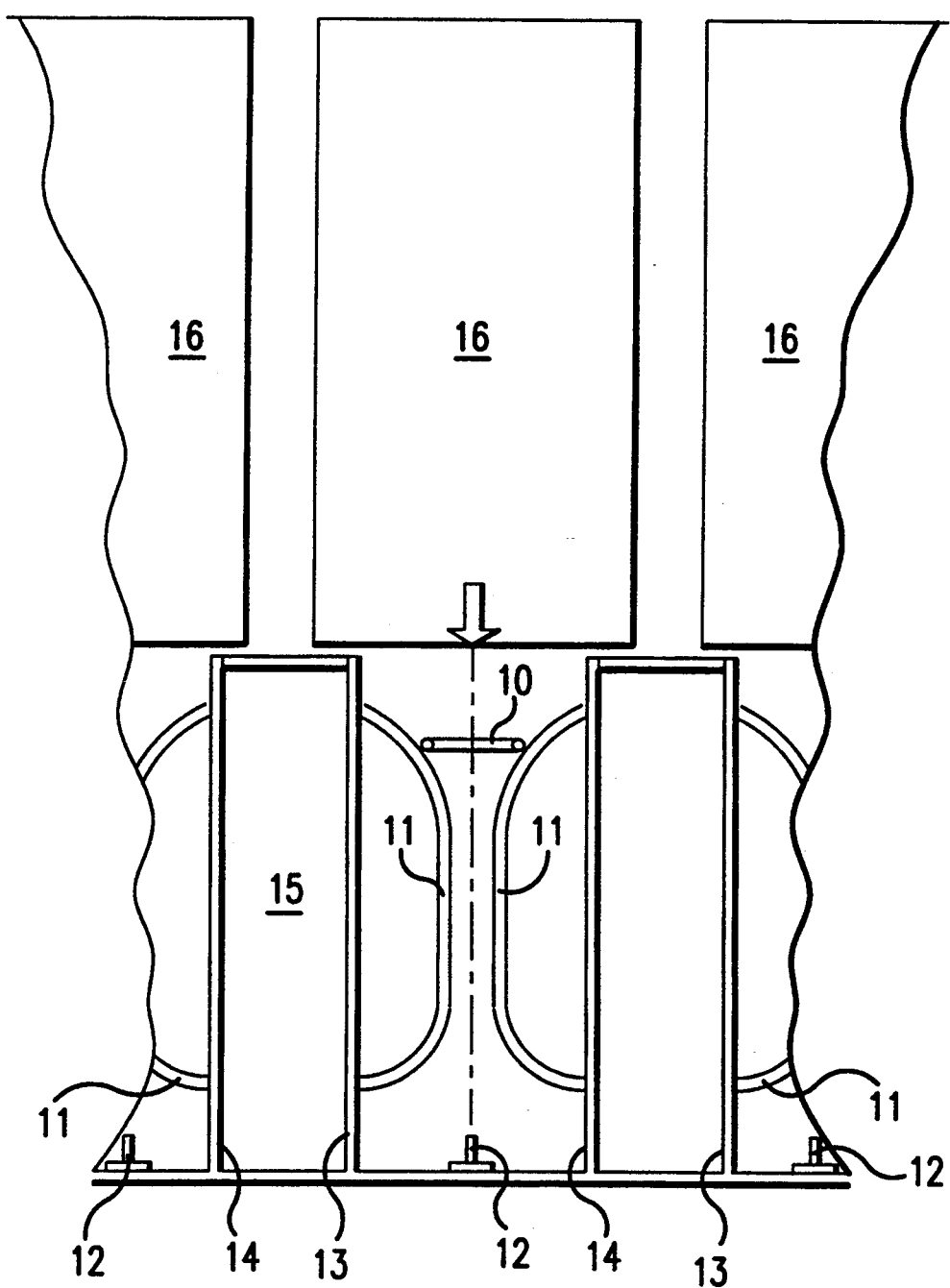
FIG. 3 shows a top view of a feed dispensing station for young animals according to this invention.

FIG. 3 shows an example (top view) of a feeding station. It includes of a means of identifying each animal present, for example by a collar 10 attached to the neck of each animal in the group to feed, in cooperation with two pivoting sliding channels 11 which spread to give clear access to the nipple 12 contributing to the identification of the animal. Also included are separating partitions 13, 14. The feeding stations are separated by a space 15 which is sufficiently large as to prevent each animal from bothering each other animal while at the feeding station. Each feeding station also has a weighing platform 16. The means for distributing the feed mix is shown in the FIGS. 4, 5, and 6. There may be up to 24 feeding stations per installation in a preferred installation. Fifteen to twenty calves can be fed by a single nipple. In an installation, where the equipment according to this invention is placed, all of the animals wearing a collar are fed according to a specific objective. The animals that do not have collars are considered trespassers and do not receive feed from the nipple. The computer system warns, by an appropriate method, the manager of the installation, of the presence of the trespasser, found on the weighing platform. This can indicate a collar that is out of order or an animal who entered the installation by accident.

Figure 4:
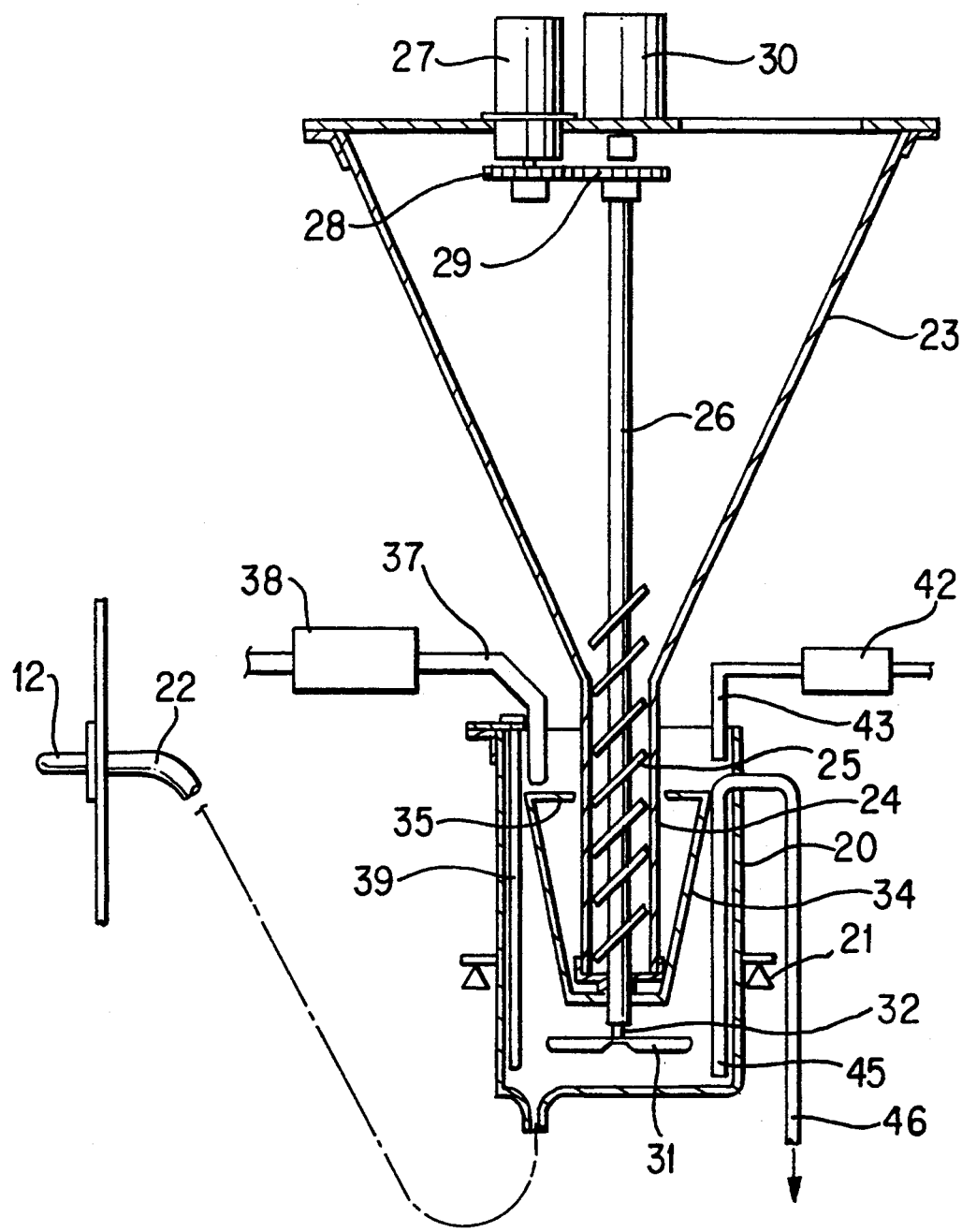
FIG. 4 shows a distributor/mixer controlled by computer according to this invention.

FIG. 4 shows a method of realizing the mixer/distributor whose operation is assisted by computer. It includes of a container 20 attached on a precision scale 21. A tube 22 connects nipple 12 to a drain in the bottom of the container. The container is supplied with milk powder by a hopper 23 whose lower tubular extremity 24 surrounds an Archimedes' screw 25 which is part of a tube 26. Tube 26 is rotated at a slow speed by a reduction motor 27 and gears 28, 29. An electric motor 30 rotates a mixing blade 31 at high speed. The mixing blade is attached to the lower extremity of a rod 32 disposed within the tube 26. The lower extremity of tube 26 has at least three arms 34 united on a disk 35 rotated by the tube 26. This disk projects the water coming from hose 37 against the internal side of the mixer container 20 so as to provide automatically a self cleaning function every time the pump 38 dispenses water to reconstitute the milk powder into milk depending on the feed mix to be realized. At least one armored electrical heating element 39 maintains a constant internal temperature with the help of a thermostat. The feed additives are dispensed with a set of peristaltic pumps 42 (see FIG. 4) whose exit hose 43 plunges into the container 20. The mixer also has a complementary means of cleaning/rinsing which includes a tube 45 acting as a siphon placed on the inside of the container and whose top extremity is situated near the top of the container. The top extremity of tube 45 passes through a side wall of the container in a water tight fashion. A hose 46 is connected to the top extremity of tube 45. Rinsing fluid is pumped into the container. When the container is full, the siphon action of tube 45 begins and the rinsing fluid passes through tube 45 and hose 46 into a waste collector (not shown). The hose 46 is preferably an inexpensive plastic hose. The wash cycle is done periodically, when no animals are present in the feeding station, by dispensing only water, with or without disinfectant, in the container, by pump 38 and by rotating the mixing blade 32. When the level of the water reaches the top of tube 45 the siphon primes and the rinse water is fully discharged by the end of the cycle. The proper operation of the set of measuring pumps supplying the mixing container is controlled on a regular basis by comparing the volume supplied by the pumps with the corresponding weight level delivered by the scale 21. The mixing container is placed at a level slightly lower than nipple so as to reduce the suction effort exerted by the animal.

Figure 5:
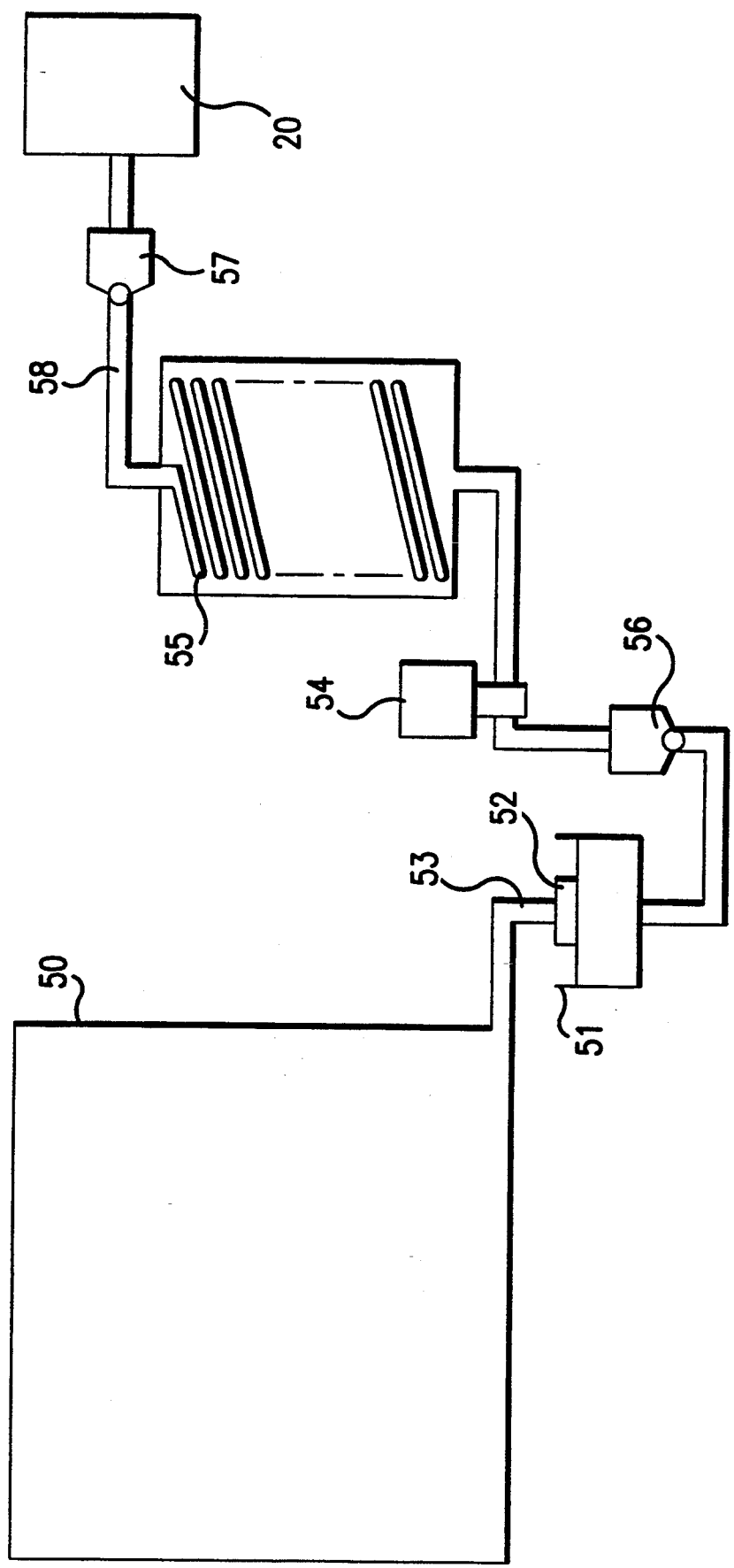
FIG. 5 shows a whole milk, or other, mixer supplying system.

FIG. 5 shows an example of a whole milk or other supplying system to the mixer container 20 from a milk tank 50 whose bottom is disposed lower than the container 20. A secondary tank 51 is equipped with a float 52 forming a valve on the supply tube 53 from milk tank 50. Milk fills the secondary container 51, until stopped by the valve while pump 54 is off, thus prohibiting the draining of tank 51. Then pump 54 fills the pre-heating coil 55. A check valve 56 maintains the pump primed and a second check valve 57 prevents the back flow of the mix held in container 20 from returning into tubing 58, coil 55 and pump 54.

Figure 6:
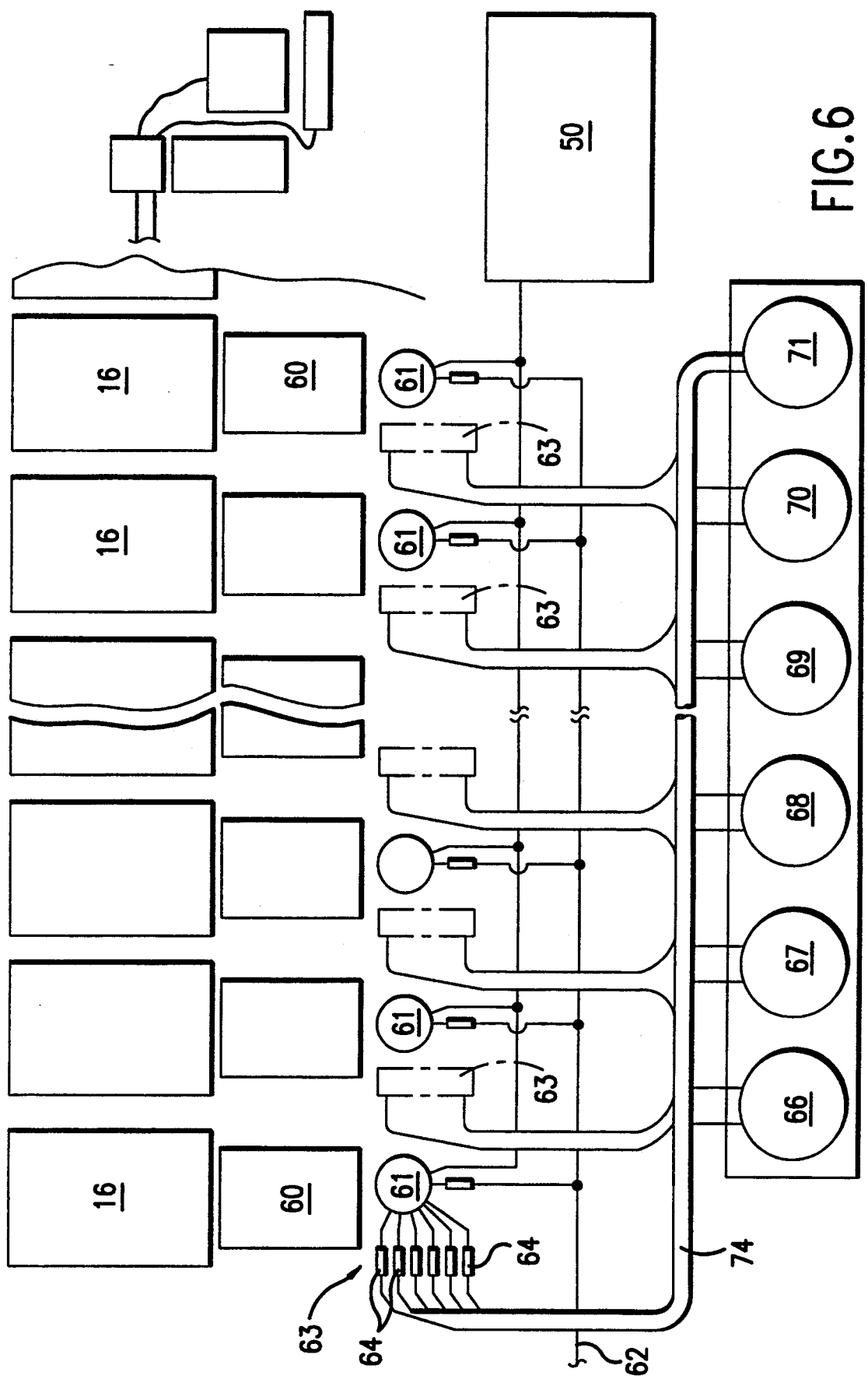
FIG. 6 shows a diagram representing the equipment according to this invention.

FIG. 6 shows an example of the equipment according to this invention. It includes a group of feeding stations 60 (see FIG. 3) each equipped with a weighing platform 16 (see FIG. 3), a mixer 61 (see FIG. 4) supplied with milk powder, water 62, whole milk from a tank 50 and supplied with various additives by means of a set 63 of measuring pumps 64 whose number of rotations is controlled by the computer system depending on the composition of the mix to be furnished.

The measuring pumps are primed by the supplying tanks 66 through 71. There are as many tanks as additives to supply. The set of measuring pumps 63 at each station 60 pumps the selectively programmed quantity from each tank 66 through 71 depending on the composition of the different mix to be furnished to each animal. The flexible hose attached between the set 63 of measuring pumps and the tank 66 through 71 have been grouped into a bundle 74 in this drawing.

Each animal who presents itself at a station 60 and is identified, is credited with a quantity of feed, typically in the order of 500 grams. The feed composition is a function of the animals previous intake, of the newly recorded weight and of the previously enumerated known criteria, for example as described in the INRA publication. The feeding station prepares the mix on demand while the animal is drinking. There always remains a certain amount of feed in the mixer after the animal's departure from the feeding station. This amount is subtracted from the animal's credit so as to precisely calculate the animal's intake.

So as to reduce the cost of certain equipment, it is planned to use a single mixer for two feeding stations. In this case, the mixer is of a larger capacity. It is then no longer possible to precisely modify the feed of the animals. The animals are most often in pairs and these pairs are almost never the same. The computer system then calculates an average, every time, using the same criteria as in the previous case for a single mixer per feeding station. The equipment averages the animals who follow the same selection program, meat production, replacement, or for reproduction.

Having described preferred embodiments of a novel computer aided feed distribution equipment for young animals (which are intended to be illustrative and not limiting), it is noted that modifications and variations can be made by those skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the following claims.

What is claimed is:

1. A feeding apparatus for feeding animals comprising:
   at least one feeding station, each feeding station including means for mixing feed components into an individualized feed portion according to at least one feed distribution signal;
   sensor set for generating a plurality of sensor signals, the plurality of sensor signals including an environmental temperature signal and at least one other sensor signal corresponding to an environment of the feeding apparatus;
   at least one monitor, each monitor corresponding to a respective feeding station of the at least one feeding station, each monitor generating at least one monitor signal, the at least one monitor signal representing animal data corresponding to a particular animal present in the feeding station and corresponding to the monitor which is generating the at least one monitor signal; and
   a processor generating the at least one feed distribution signal for each feeding station of the at least one feeding station, the at least one feed distribution signal corresponding to each feeding station being generated based on the plurality of sensor signals and the at least one monitor signal corresponding to the feeding station for which the at least one feed distribution signal is generated.

2. The apparatus of claim 1, wherein the sensor set includes at least one of a hygrometer, a pluviometer, means for measuring sunlight, means for measuring solar rays, and means for measuring cosmic rays.

3. The apparatus of claim 1, wherein the sensor set includes at least one of means for measuring a local magnetic field and means for analyzing air around the feeding apparatus.

4. The apparatus of claim 1, wherein the processor includes means for recording animal age factors and adjusting the proportions of the feed components mixed for the particular animal.

5. The apparatus of claim 1, wherein the processor includes means for recording seasonal factors and adjusting the proportions of the feed components mixed based on a present season.

6. The apparatus of claim 1, wherein the at least one monitor signal includes a judgment signal entered into the processor by a grower, the judgment signal corresponding to an animal grower's expert judgment of a change in one of the animal's fat thickness, muscle tone, behavior and health.

7. The apparatus of claim 1, further including means for testing the particular animal to periodically determine particular properties of the particular animal present in the feeding station, the particular properties including at least one of assimilation rate and level of a component of the feed components, blood properties and urine properties.

8. The apparatus of claim 7, wherein the processor further includes means for recording the particular properties.

9. The apparatus of claim 7, wherein the means for testing includes excrement analysis means for determining assimilation rate and level.

10. The apparatus of claim 7, wherein the processor further includes:
    means for comparing the particular properties determined by the means for testing to determine differences in test results; and
    means for transforming the differences in test results into modifications of the proportions of the feed components mixed into the individualized feed portion.

11. The apparatus of claim 10, wherein the means for mixing includes means for controlling the proportions of the feed components mixed into the individualized feed portion based on the modifications to the proportions transformed from the differences in test results.

12. The apparatus of claim 11, wherein the means for controlling the proportions also controls the proportions based on the environment of the feeding apparatus.

13. A feeding apparatus for feeding animals comprising:
    at least one feeding station, each feeding station including means for mixing an individualized feed portion;
    sensor set for generating at least one sensor signal, the at least one sensor signal corresponding to an environment of the feeding apparatus;
    at least one monitor, each monitor corresponding to a respective feeding station of the at least one feeding station, each monitor generating at least one monitor signal, the at least one monitor signal presenting animal data corresponding to a particular animal present in the feeding station and corresponding to the monitor which is generating the at least one monitor signal: and
    a processor generating at least one feed distribution signal for each feeding station of the at least one feeding station, the at least one feed distribution signal corresponding to each feeding station being based on the at least one sensor signal and the at least one monitor signal corresponding to the feeding station for which the at least one feed distribution signal is generated, the processor including (1) means for recording a weight of the particular animal present in the corresponding feeding station; (2) means for recording the proportions of the feed components mixed for the particular animal; and (3) means for determining criteria relating to assessing a maximization of growth for each recorded mix of proportions of the feed components, the criteria including at least one of a comparison of a yield in weight between each stay in the feeding station and a frequency of stay, wherein the processor includes:
    means for recording the at least one sensor signal corresponding to the environment;
    means for recording seasonal factors and adjusting the proportions of the feed components mixed for the particular animal; and
    means for recording animal age factors and adjusting the proportions of the feed components mixed for the particular animal.

14. A feeding apparatus for feeding animals comprising:
    at least one feeding station;
    sensor set for generating at least one sensor signal, the at least one sensor signal corresponding to an environment of the feeding apparatus;

at least one monitor, each monitor corresponding to a respective feeding station of the at least one feeding station, each monitor generating at least one monitor signal, the at least one monitor signal representing animal data corresponding to a particular animal present in the feeding station and corresponding to the monitor which is generating the at least one monitor signal, the animal data including the weight of the particular animal; and a processor generating at least one feed distribution signal for each feeding station of the at least one feeding station, the at least one feed distribution signal corresponding to each feeding station being generated based on the at least one sensor signal and the at least one monitor signal corresponding to the feeding station for which the at least one feed distribution signal is generated, wherein each feeding station of the at least one feeding station includes means for mixing feed components into an individualized feed portion for the particular animal present in the feeding station, proportions of the feed components mixed into the individualized feed portion being based on the at least one feed distribution signal corresponding to the feeding station, and wherein the processor includes:

means for recording the weight of the particular animal present in the corresponding feeding station;

means for determining a frequency of stay of the particular animal present in the corresponding feeding station;

means for recording the proportions of the feed components mixed for the particular animal; and means for determining criteria relating to assessing a maximization of growth for each recorded mix of proportions of the feed components, the criteria including at least one of a comparison of a yield in weight between each stay in the feeding station and the frequency of stay.

15. A feeding apparatus for feeding animals comprising:
at least one feeding station, each feeding station including means for mixing an individualized feed portion;
sensor set for generating at least one sensor signal, the at least one sensor signal corresponding to an environment of the feeding apparatus;
at least one monitor, each monitor corresponding to a respective feeding station of the at least one feeding station, each monitor generating at least one monitor signal, the at least one monitor signal representing animal data corresponding to a particular animal present in the feeding station and corresponding to the monitor which is generating the at least one monitor signal; and
a processor generating at least one feed distribution signal for each feeding station of the at least one feeding station, the at least one feed distribution signal corresponding to each feeding station being based on the at least one sensor signal and the at least one monitor signal corresponding to the feeding station for which the at least one feed distribution signal is generated, the processor including (1) means for recording a weight of the particular animal present in the corresponding feeding station; (2) means for recording the proportions of the feed components mixed for the particular animal; and (3) means for determining criteria relating to assessing a maximization of growth for each recorded mix of proportion of the feed components, the criteria including at least one of a comparison of a yield in weight between each stay in the feeding station and a frequency of stay, wherein the particular animal is one animal of a group of animals using the feeding apparatus, the processor further including:

individualizing means for (i) operating the means for recording the weight, (ii) operating the means for recording the proportions and (iii) operating the means for determining the criteria, for each animal in the group of animals; and means for averaging the criteria corresponding to each animal in the group of animals over the group of animals to determine an averaged criteria for the group of animals.

16. The apparatus of claim 15, wherein the processor further includes means for comparing the criteria corresponding to each animal in the group of animals with the averaged criteria.

17. The apparatus of claim 15, wherein the processor further includes means for comparing a first criteria corresponding to a first animal in the group of animals and a second criteria corresponding to a second animal in the group of animals, the first and second criteria being determined by the means for determining the criteria, the first animal being an animal fed a first individualized feed portion having a first proportion of the feed components mixed therein, the second animal being an animal fed a second individualized feed portion having a second proportion of the feed components mixed therein.

18. The apparatus of claim 17, wherein the first criteria is a comparison of the yield in weight for the first animal between each stay in the feeding station.

19. A feeding apparatus for feeding animals comprising:
at least one feeding station, each feeding station including means for mixing feed components into an individualized feed portion;
sensor set for generating at least one sensor signal, the at least one sensor signal corresponding to an environment of the feeding apparatus;
at least one monitor, each monitor corresponding to a respective feeding station of the at least one feeding station, each monitor generating at least one monitor signal, the at least one monitor signal representing animal data corresponding to a particular animal present in the feeding station and corresponding to the monitor which is generating the at least one monitor signal; and
a processor generating at least one feed distribution signal for each feeding station of the at least one feeding station, the at least one feed distribution signal corresponding to each feeding station being based on the at least one sensor signal and the at least one monitor signal corresponding to the feeding station for which the at least one feed distribution signal is generated, wherein for each feeding station of the at least one feeding station, the feeding apparatus includes an additional feeding station, each additional feeding station sharing the means for mixing feed components of the corresponding feeding station of the at least one feeding station, the individualized feed portions being based on an average of feed portions for both the animal in the additional feeding station and the animal in the corresponding feeding station of the at least one feeding station.

20. A feeding apparatus for feeding animals comprising:
at least one feeding station, each feeding station including means for mixing feed components into an individualized feed portion according to at least one feed distribution signal;
sensor set for generating at least one sensor signal, the at least one sensor signal corresponding to an environment of the feeding apparatus;
at least one monitor, each monitor corresponding to a respective feeding station of the at least one feeding station, each monitor generating a plurality of monitor signals, the plurality of monitor signals including an animal weight signal, an animal identification signal and at least one other monitor signal representing animal data corresponding to a particular animal present in the feeding station and corresponding to the monitor which is generating the at least one monitor signal; and
a processor generating the at least one feed distribution signal for each feeding station of the at least one feeding station, the at least one feed distribution signal corresponding to each feeding station being generated based on the at least one sensor signal and the plurality of monitor signals corresponding to the feeding station for which the at least one feed distribution signal is generated.

21. The apparatus of claim 20, wherein the sensor set includes at least one of means for measuring a local magnetic field and means for analyzing air around the feeding apparatus.

22. The apparatus of claim 20, wherein the processor includes means for recording animal age factors and adjusting the proportions of the feed components mixed for the particular animal identified as present in the corresponding feeding station.

23. The apparatus of claim 20, wherein the at least one other monitor signal includes a judgment signal entered into the processor by a grower, the judgment signal corresponding to an animal grower's expert judgment of a change in one of the animal's fat thickness, muscle tone, behavior and health.

24. The apparatus of claim 20, further including means for periodically testing to determine particular properties of the identified animal, the particular properties including at least one of assimilation rate and level of a component of the feed components, blood properties and urine properties.

25. The apparatus of claim 20, wherein the processor includes means for recording seasonal factors and adjusting the proportions of the feed components mixed based on a present season.

26. A feeding apparatus for feeding animals comprising:
at least one feeding station, each feeding station including means for mixing feed components;
sensor set for generating at least one sensor signal, the at least one sensor signal corresponding to an environment of the feeding apparatus;
at least one monitor, each monitor corresponding to a respective feeding station of the at least one feeding station, each monitor generating at least one monitor signal, the at least one monitor signal representing animal data corresponding to a particular animal present in the feeding station and corresponding to the monitor which is generating the at least one monitor signal; and
a processor generating at least one feed distribution signal for each feeding station of the at least one feeding station, the at least one feed distribution signal corresponding to each feeding station being based on the at least one sensor signal and the at least one monitor signal corresponding to the feeding station for which the at least one feed distribution signal is generated, wherein the means for mixing includes:
a precision scale;
a container disposed on the precision scale, the container having a drain;
a feeding hose connected at one end to the drain; and
a nipple connected to another end of the feeding hose.

27. The apparatus of claim 26, wherein the means for mixing further includes:
a hopper containing a feed powder, the hopper having a lower tubular extremity;
an Archimedes' screw disposed within the tubular extremity;
a hollow tube attached to the Archimedes' screw; and
motor means for rotating the hollow tube at slow speed to dispense the feed powder into the container.

28. The apparatus of claim 27, wherein the means for mixing further includes:
a rod having first and second ends disposed within the hollow tube;
a mixing blade attached to the rod at the first end, the mixing blade being disposed within the container; and
a mixing motor attached to the rod at the second end to turn the mixing blade at high speed.

29. The apparatus of claim 27, wherein the means for mixing further includes:
a cleaning disk horizontally disposed and fixedly attached to the hollow tube; and
a fluid hose connected to a fluid source, the fluid hose being disposed so as to discharge a fluid onto a top surface of the cleaning disk.

30. The apparatus of claim 29, wherein the mixing means further includes:
a siphon tube having first and second ends, the first end being disposed near a bottom of an inside of the container, the siphon tube extending in a water tight fashion through a hole in a side wall of the container to the second end; and
a siphon hose attached at one end to the second end of the siphon tube, the siphon hose discharging into a waste container at another end of the siphon hose.

31. The apparatus of claim 30, wherein the means for mixing further includes:
a rod having first and second ends disposed within the hollow tube;
a mixing blade attached to the rod at the first end, the mixing blade being disposed within the container;
a mixing motor attached to the rod at the second end to turn the mixing blade at high speed;
means for controlling a cleaning cycle, the means for controlling a cleaning cycle including:
means for discharging one of water and water with disinfectant through the fluid hose onto the top surface of the cleaning disk;
means for operating the motor means to rotate the hollow tube and the cleaning disk attached thereto so that a fluid discharged from the fluid hose onto the top surface of the cleaning disk is forced centrifugally radially outwardly to the circumference of the cleaning disk and from there into the container; and means for operating the mixing motor to mix any residue contained in the container with the fluid, the fluid being one of water and water with disinfectant, the siphon tube automatically operating as a siphon pump to siphon the residue mixed fluid in the container into the waste container when the fluid in the container fills to a same level within the container as the hole in the side wall of the container.

32. The apparatus of claim 31, wherein the processor further includes means for operating the means for controlling a cleaning cycle when no animal is present in the corresponding feeding station.

33. The apparatus of claim 27, wherein the means for mixing further includes:

at least one additive pump, each additive pump having an exit hose which is plunged into the container, each additive pump being controlled by a signal of the at least one feed distribution signal to dispense a controlled quantity of a corresponding feed additive, each additive pump pumping a corresponding feed additive from a corresponding additive supply tank according to a respective feed distribution signal;

means for supplying a controlled quantity of water to the container;

means for supplying a controlled quantity of a feed liquid to the container; and mix control means for controlling the quantity added to the container of at least one of feed powder, water, feed liquid and at least one feed additive.

34. The apparatus of claim 33, wherein the feed powder is powdered milk and the feed liquid is one of fresh and reconstituted powdered milk.

35. The apparatus of claim 33, wherein:

the animal data generated by the monitor corresponding to the particular animal present in the feeding station includes an identity of the animal present in the feeding stations and a weight of the animal present in the feeding station;

the processor includes means for recalling past proportions of the feed components mixed into the individualized feed portion based on the identity of the particular animal present in the feeding station;

the processor further includes means for recalling a past weight of the particular animal present in the feeding station, the past weight being the weight of the animal when the animal was last in a feeding station of the at least one feeding station; and the processor further includes means for transforming (i) a difference in the weight of the animal in the feeding station and the past weight, (ii) the past proportions, and (iii) a past quantity of feed consumed by the animal present in the feeding station, into new proportions of the feed components, and then generating the at least one feed distribution signal based on the new proportions.

36. The apparatus of claim 35, wherein the processor further includes:

means for determining a quantity of feed remaining in the container after the particular animal has left the feeding station; and means for determining an exact feed intake for the animal by deducting the quantity of feed remaining from a quantity of feed prepared.

37. The apparatus of claim 26, wherein the means for mixing further includes at least one armored electrical heating element disposed within the container, the heating element cooperating with a thermostat to maintain at constant temperature a contents in the container.

38. The apparatus of claim 26, wherein the means for mixing further includes at least one additive pump, each additive pump having an exit hose which is plunged into the container, each additive pump being controlled by a signal of the at least one feed distribution signal to dispense a controlled quantity of a corresponding feed additive.

39. The apparatus of claim 38, wherein each additive pump is a peristaltic pump.

40. The apparatus of claim 38, wherein:

the precision scale produces a weight signal indicative of a weight of a contents of the container; and the processor produces at least one control signal, each control signal being based on the weight signal and a corresponding feed additive requirement, each control signal controlling a corresponding additive pump of the at least one additive pump.

41. The apparatus of claim 26, wherein the means for mixing includes a supply system, the supply system comprising:

a liquid feed source;

a preheating coil having first and second ends to preheat a feeding liquid passing therethrough;

a pump having a discharge and connected to the first end of the preheating coil;

a first check valve having an input connected to the liquid feed source and having a discharge end connected to an input of the pump, the first check valve maintaining the pump in a primed state; and a second check valve having an input connected to the second end of the preheating coil and having a discharge end plunged into the container, the second check valve preventing back flow from the container.

42. The apparatus of claim 41, wherein the liquid feed source includes:

a liquid feed tank with a bottom and having a discharge tube, the liquid feed tank being disposed so that the bottom of the liquid feed tank is lower than the container; and a secondary tank having a drain connected to the input of the first check valve and a float, the float acting as a valve by operating against the discharge tube of the liquid feed tank when the secondary tank is full.

* * * * *